US009874485B2

United States Patent
McCormick (10) Patent No.: US 9,874,485 B2
(45) Date of Patent: Jan. 23, 2018

(54) VALVE STEM CONNECTOR WITH INTEGRATED STEM FORCE MEASUREMENT

(71) Applicant: FISHER CONTROLS INTERNATIONAL LLC, Marshalltown, IA (US)

(72) Inventor: Nathan McCormick, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 239 days.

(21) Appl. No.: 14/037,967

(22) Filed: Sep. 26, 2013

(65) Prior Publication Data

US 2015/0082902 A1 Mar. 26, 2015

(51) Int. Cl.
*G01L 5/12* (2006.01)
*G01L 5/00* (2006.01)
(Continued)

(52) U.S. Cl.
CPC ........ *G01L 5/0028* (2013.01); *F16K 37/0041* (2013.01); *G01G 3/1412* (2013.01);
(Continued)

(58) Field of Classification Search
CPC ............. F16K 37/0083; F16K 37/0041; G01L 5/0061; G01L 5/0028; G01L 5/12; G01L 17/005; G01L 1/2243
(Continued)

(56) References Cited

U.S. PATENT DOCUMENTS 3,949,603 A * 4/1976 Laimins ................ G01L 1/2206
177/211
4,283,941 A 8/1981 Kutsay
(Continued)

FOREIGN PATENT DOCUMENTS

EP 0483912 A1 5/1992
EP 0660095 A2 6/1995

OTHER PUBLICATIONS

"Narrow" Collins Dictionary. Accessed [Online] Mar. 31, 2017. <https://www.collinsdictionary.com/dictionary/english/narrow>.*
(Continued)

*Primary Examiner* — Jonathan Dunlap
(74) *Attorney, Agent, or Firm* — Marshall, Gerstein & Borun LLP (57) ABSTRACT

A valve stem connector comprises a first half and a second half, each of which includes a top section adapted to receive a portion of an actuator and a bottom section adapted to receive a portion of a valve stem. A plurality of cut-away sections is disposed in each of the first and second halves, and a pair of shear web installation sites is disposed between the plurality of cut-away sections on each of the first and second halves. A force measurement device is disposed in each shear web installation site of the pair of shear web installation sites, the force measurement device for measuring the strain on the valve stem. Each shear web installation site has a shear strain measurable by the force measurement device, and the plurality of cut-away sections allows for a bending beam near each pocket to minimize deflection.

20 Claims, 5 Drawing Sheets

(51) Int. Cl.
*G01G 3/14* (2006.01)
*G01L 1/22* (2006.01)
*F16K 37/00* (2006.01)
*G01L 17/00* (2006.01)

(52) U.S. Cl.
CPC ........ *G01L 1/2243* (2013.01); *F16K 37/0083* (2013.01); *G01L 5/0061* (2013.01); *G01L 5/12* (2013.01); *G01L 17/005* (2013.01)

(58) Field of Classification Search
USPC ............... 73/862.49, 841, 862.621, 862.627
See application file for complete search history.

(56) References Cited

U.S. PATENT DOCUMENTS

| | | | | |
|---|---|---|---|---|
| 4,459,863 A * | 7/1984 | Nordstrom | ........... | G01G 3/1404 177/211 |
| 4,516,646 A * | 5/1985 | Bergfalk | ............... | G01L 1/2225 177/211 |
| 4,775,018 A * | 10/1988 | Kroll | .................... | G01G 19/027 177/134 |
| 4,930,228 A * | 6/1990 | Anderson | ................ | G01B 5/30 33/788 |
| 4,936,150 A * | 6/1990 | Burke | ..................... | G01B 5/30 33/788 |
| 5,199,518 A * | 4/1993 | Woodle | ................ | G01G 3/1402 177/211 |
| 5,228,527 A * | 7/1993 | Kroll | .................... | G01G 3/1402 177/211 |
| 5,469,737 A * | 11/1995 | Smith | ................... | G01L 5/0061 137/552 |
| 5,747,697 A | 5/1998 | Johnson et al. | | |
| RE35,918 E | 10/1998 | Anderson et al. | | |
| 5,962,792 A * | 10/1999 | Kimerer, Jr. | ............. | G01B 7/16 73/772 |
| 6,230,571 B1 * | 5/2001 | Kimerer, Jr. | ............. | G01B 7/16 73/862.637 |
| 6,240,789 B1 * | 6/2001 | Morlan | ..................... | G01B 5/30 73/168 |
| 8,006,574 B2 * | 8/2011 | Meyer | .................. | G01L 3/1457 702/44 |
| 2005/0000304 A1 * | 1/2005 | Smith | ...................... | G01B 7/18 73/862.637 |
| 2007/0095156 A1 * | 5/2007 | Smith | ...................... | G01B 7/18 73/862.637 |

OTHER PUBLICATIONS

International Search Report and Written Opinion from International Application No. PCT/US2014/057414 dated Feb. 16, 2015.
Strain Gage Based Transducers; Their Design and Construction, Second Ed., Chapter. 2, "Load Cells" pp. 7-11, 20-25, 48-49 (1998).
International Preliminary Report on Patentability for Application No. PCT/US2014/057414 dated, Mar. 29, 2016.

\* cited by examiner

VALVE STEM CONNECTOR WITH INTEGRATED STEM FORCE MEASUREMENT

FIELD OF TECHNOLOGY

The present disclosure relates generally to valve stem force measurement devices and, more particularly, to a valve stem connector having an integrated stem force measurement device.

BACKGROUND OF THE DISCLOSURE

Load cells or strain gage transducers are example force measurement devices commonly used in a variety of industries. A shear-web load cell or strain gage design or configuration is typically used in large force level load cells. An important component in the load cell, or strain gage transducer, is generally the spring element. Broadly stated, the function of the spring element is to serve as the reaction for the applied load. Implicit in this definition is the assumption that the strain level in the gaged area of the spring element responds in a linear-elastic manner to the applied load. In other words, the ideal transducer would be characterized by an unvarying, proportional relationship between the strain and the load. See *Strain Gage Based Transducers*, Chapter 2, "Load Cells" by Measurements Group, Inc. (1998).

Figure 1A:
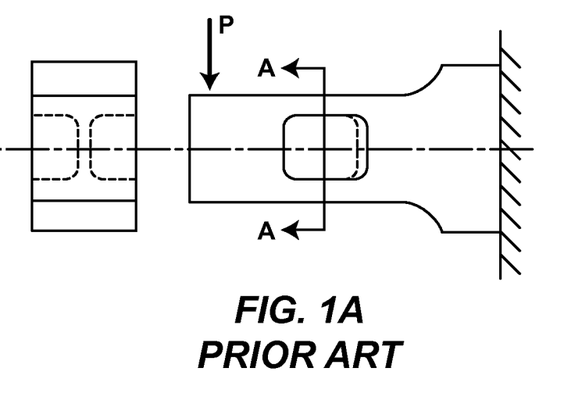
FIG. 1A is a schematic, perspective view of a conventional shear-web spring element of a force measurement device having the form of a cantilever beam.

More specifically, and as illustrated in FIG. 1A, a shear-web based spring element of the load cell or strain gage may take the form of a cantilever beam, which has been designed with a generous cross-section to minimize deflection. At section A-A of the beam, a recess has been machined in the side, leaving a relatively thin web in the center. Most of the shear force imposed by the load is carried by the web, while the bending moment is resisted by the flanges.

Figure 1B:
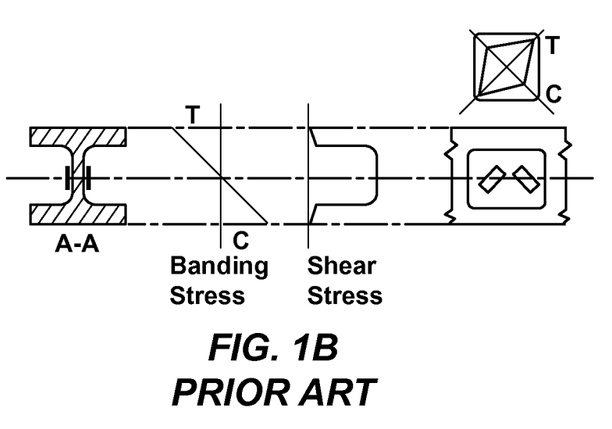
FIG. 1B is a cross-sectional view of the conventional shear-web spring element of FIG. 1A, taken along the line A-A of FIG. 1A and graphical representations of shear and bending stress distributions on this section.

Referring now to FIG. 1B, a cross-section A-A is depicted, along with shear and bending stress distributions in this cross-section. At the neutral axis, where the bending stress is zero, the state of stress on the web is one of pure shear, acting in the vertical and horizontal directions.

Figure 1C:
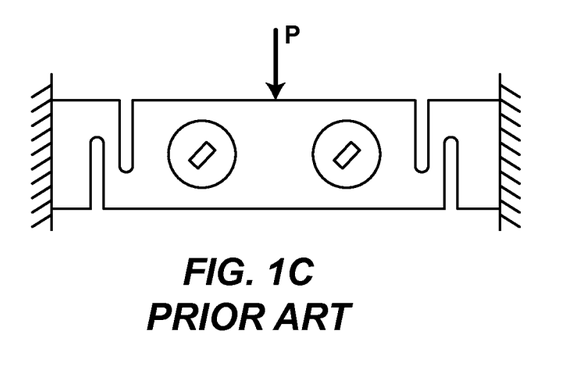
FIG. 1C is a schematic, perspective view of another conventional shear-web spring element of a force measurement device having dual shear webs in a beam configuration.

Shear-web spring elements are not limited to cantilever-beam configurations. For example, FIG. 1C illustrates a simply supported beam because of the flexures or cut-away sections at both ends. In other words, FIG. 1C depicts dual shear webs in a beam configuration that are designed to cancel the effects of the off-axis and side loads.

Several design considerations are generally applicable to all load cell spring elements including: (1) appropriate strain level in the gage area at rated load; (2) uniform strain distribution in the strain gage area; (3) lower strain levels throughout the remainder of the spring element; (4) monolithic (one-piece) construction; (5) design for ease of machining and gage installation; (6) spring element deflection; and (7) thermal considerations. See *Strain Gage Based Transducers*, Chapter 2, "Load Cells" by Measurements Group, Inc. (1998).

In nuclear power plants and other valve installations, it is desirable to have an independent verification of the force or load applied by an actuator on a valve stem to allow for more precise diagnostics. Several solutions are available. One is to install a known strain gage or load cell directly on the valve stem. This procedure, however, is time consuming and requires special chemicals and techniques to achieve a consistent, accurate gage installation. The measured force values must be inferred from the properties of the material of the valve stem, and no provision is made for corrections due to ambient temperature or creep.

A second method involves buying a valve stem that already has a strain gage installed inside. This method allows for calibration and many of the compensation features that are common in load cell configurations, but is not viable for stems that are welded to the valve plug. In addition, the cost for custom stem configurations can be high.

SUMMARY OF THE DISCLOSURE

In accordance with a first exemplary aspect, a valve stem connector comprises a first half and a second half secured to the first half, each of which includes a top section adapted to receive a portion of an actuator and a bottom section adapted to receive a portion of a valve stem. A pair of cut-away sections is disposed in each top section of the first and second halves, each pair of cut-away sections having a first cut-away section disposed left of center of the first and second halves and a second cut-away section disposed right of center of the first and second halves and opposite the first cut-away section. A third cut-away section is disposed in each bottom section of the first and second halves, and a pair of shear web installation sites is disposed on each of the first and second halves. Each pair of shear web installation sites comprises a first site disposed between the first and third cut-away sections of each of the first and second halves and a second site disposed between the second and third cut-away sections of the first and second halves. A force measurement device is disposed in each pocket of each pair of shear web installation sites, wherein each shear web installation site has a shear strain measurable by the force measurement device and at least one of the first, second and third cut-away sections create a bending beam near each pocket to minimize deflection.

In accordance with a second exemplary aspect, a fluid flow control device comprises an actuator, a valve assembly having a valve stem and a valve stem connector removeably disposed between the actuator and the valve stem and connecting the actuator to the valve assembly. The valve stem connector comprises a body having a first half and a second half secured to the first half, each of which includes a top section receiving a portion of the actuator and a bottom section receiving a portion of the valve stem and a plurality of cut-away sections. A pair of pockets is disposed between the plurality of cut-away sections. The valve stem connector further comprises a force measurement device disposed in each pocket of the pair of pockets on the first and second halves of the valve body, wherein the plurality of cut-away sections allows for a bending beam near each pocket to minimize deflection and each pocket creates a shear web installation site having a shear strain measurable by the field measurement device.

DETAILED DESCRIPTION OF THE DISCLOSURE

Generally, a valve stem connector having an integrated force measurement device, such as a strain gage or load cell, is disclosed. Such a construction replaces: (1) field bonded strain gages; and (2) valve stems with internally mounted strain gages, simplifying replacement and installation of the strain gage or force measurement device, for example. In addition, this construction significantly reduces the cost and complexity of installing a force measurement device on the valve stem to measure valve stem load, for example, especially when making the installation inside containment in a nuclear power station.

Figure 2:
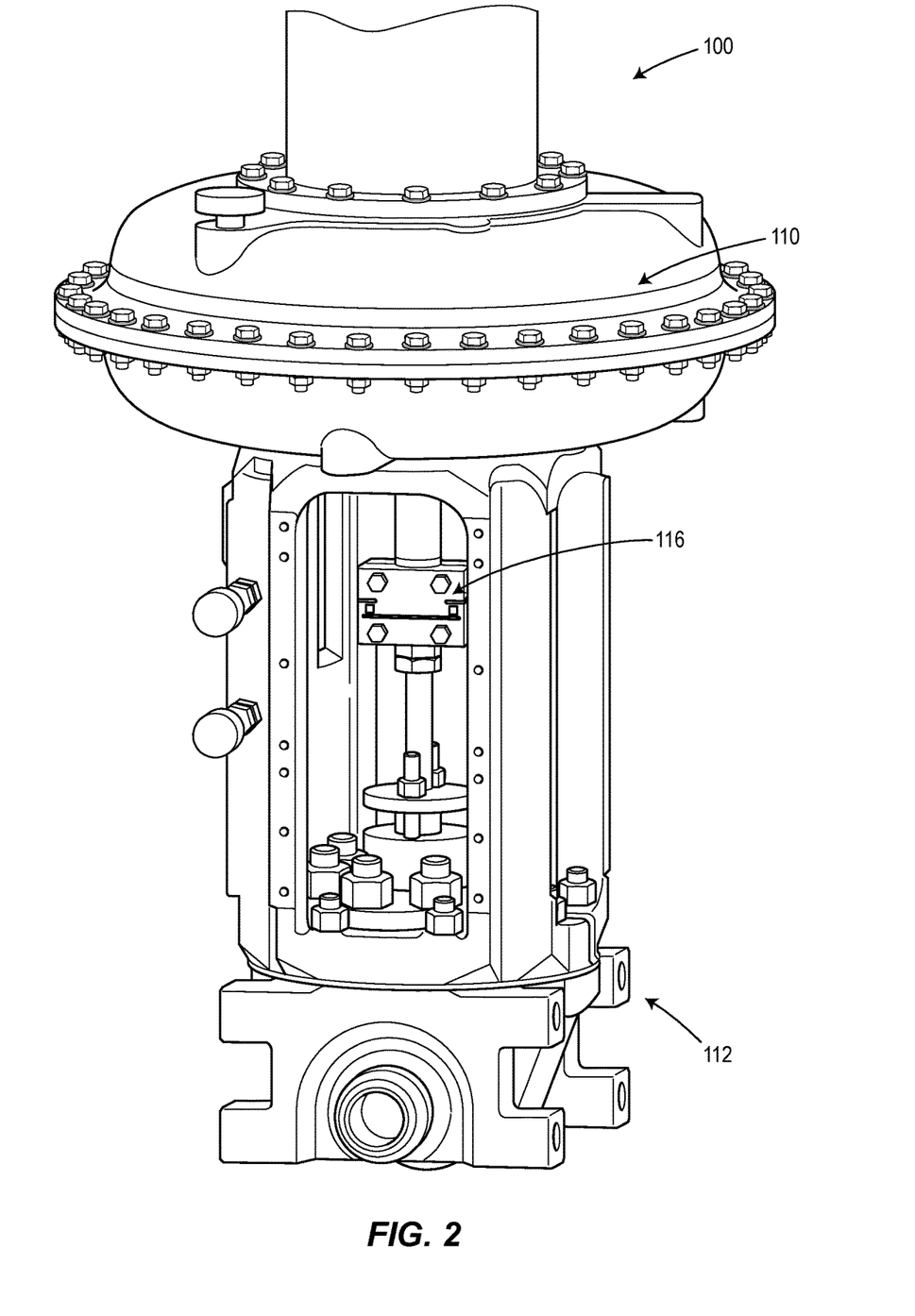
FIG. 2 is a perspective view of a valve stem connector of the present disclosure connected to an actuator and a valve stem.

More specifically, FIG. 2 depicts a fluid control device 100 having an actuator 110 and a valve assembly 112 having a valve stem 114. A valve stem connector 116 is removably disposed between the actuator 110 and the valve stem 114 and connects the actuator 110 to the valve assembly 112. The valve stem connector 116 includes at least one integrated strain gage for measuring a force load by the actuator 110 on the valve stem 114, as explained in more detail below.

Figure 3:
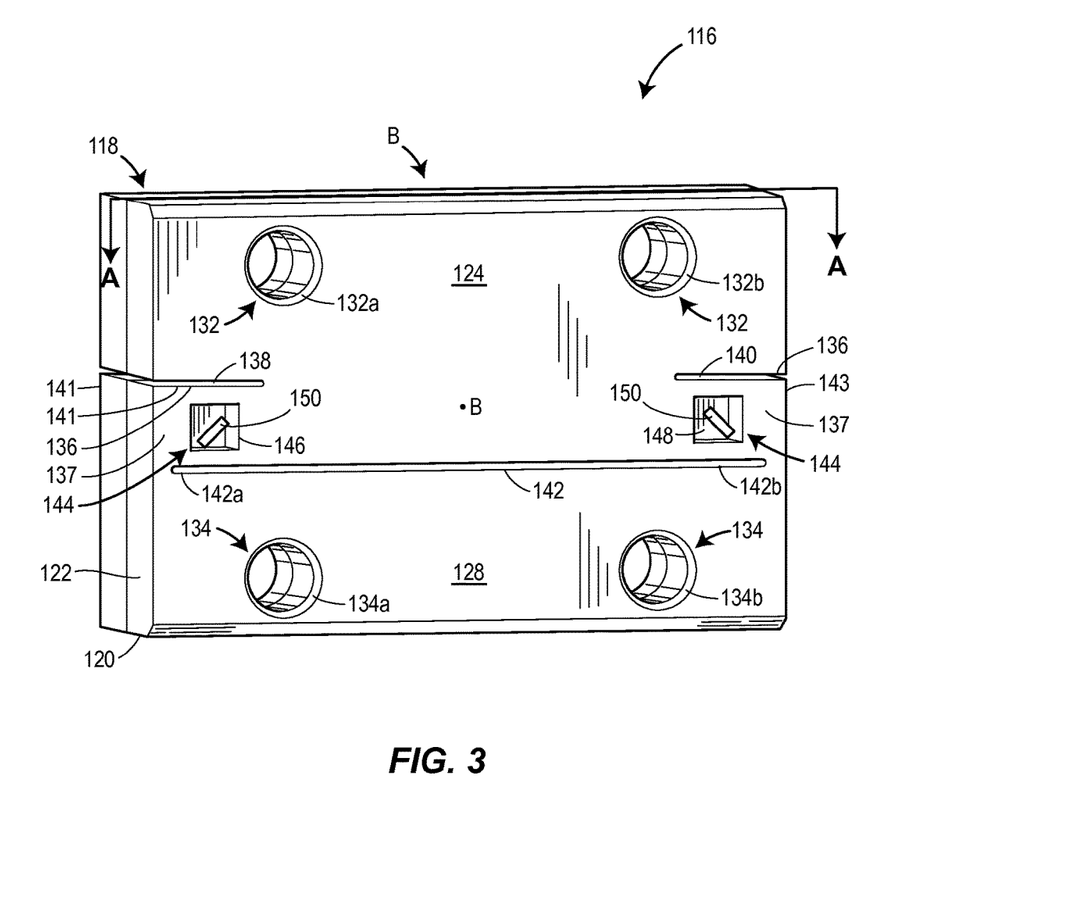
FIG. 3 is a front, perspective view of the valve stem connector of FIG. 2.

Referring now to FIG. 3, the valve stem connector 116 includes a body 118 having a first half 120 and a second half 122. Each of the first and second halves 120, 122 includes a top section 124 having a first recess 126 (FIG. 4) adapted to receive a portion of the actuator 110 and a bottom section 128 having a second recess 130 (FIG. 4) adapted to receive a portion of the valve stem 114 of the valve assembly 112. In one example, each of the top and bottom sections 124, 128 of the first and second halves 120, 122 of the body 118 may include a threaded section that allows for connection to the actuator 110 and the valve stem 114, respectively.

A first pair of holes 132 is disposed on the top sections 124 of each of the first and second halves 120, 122. In a similar manner, a second pair of holes 134 is disposed on the bottom sections 128 of the first and second halves 120, 122 of the body 118. Each hole of the first and second pairs of holes 132, 134 is adapted to receive a fastener (not shown) for securing the first half 120 to the second half 122 to form the body 118. While the fastener is a bolt in one example, the fastener may also be a screw, a nail, a pin, or any other mechanism capable of securing members together.

More specifically, the first pair of holes 132 of each of the first and second halves 120, 122 includes a first hole 132a disposed left of center of the first and second halves 120, 122 and a second hole 132b disposed right of center of the first and second halves 120, 122. In other words, the first hole 132a and the second hole 132b are disposed on either side of the center of the first and second halves 120, 122 at the top section 124 of the first and second halves 120, 122. The distance between the center of each of the first and second halves 120, 122 and the center of each of the first and second holes 132a, 132b of the first pair of holes 132, respectively, is the same. Said another way, the first hole 132a and the second hole 132b are horizontally aligned at the top section 124 of each of the first and second halves 120, 122 and disposed the same distance from the center of the first and second halves 120, 122.

In a similar manner, and as FIG. 3 further depicts, the second pair of holes 134 is disposed directly below the first pair of holes 132 at the bottom section 128 of the first and second halves 120, 122 and likewise includes a first hole 134a disposed left of center of the first and second halves 120, 122 and a second hole 134b disposed right of center of the first and second halves 120,122. In other words, the second pair of holes 134 is vertically aligned with the first pair of holes 132 on each of the first and second halves 120, 122. Like the first pair of holes 132, the distance between the center of each of the first and second halves 120, 122 and the center of each of the first and second holes 134a, 134b of the second pair of holes 134 is the same. Said another way, the first hole 134a and the second hole 134b of the second pair of holes 134 are horizontally aligned at the bottom section 128 of each of the first and second halves 120, 122 and disposed an equal distance from the center of the first and second halves 120, 122.

As further illustrated in FIG. 3, the body 118 of the valve stem connector 116 includes a plurality of cut-away sections or flexures 136 on each of the first and second halves 120, 122. More specifically, a pair of cut-away sections or flexures 136 is disposed on each top section 124 of the first and second halves 120, 122 below the first pair of holes 132. Each pair of cut-away sections 136 includes a first cut-away section 138 disposed left of center of the first and second halves 120, 122 and a second cut-away section 140 disposed right of center of the first and second halves 120, 122 of the body 118, such that the first and second cut-away sections 138, 140 are horizontally aligned with each other on the top section 124 of the first and second halves 120, 122. In one example, the first and second cut-away sections 138, 140 are slits in outer left and right or side edges 141, 143, respectively, of each of the first and second halves 120, 122.

Figure 4:
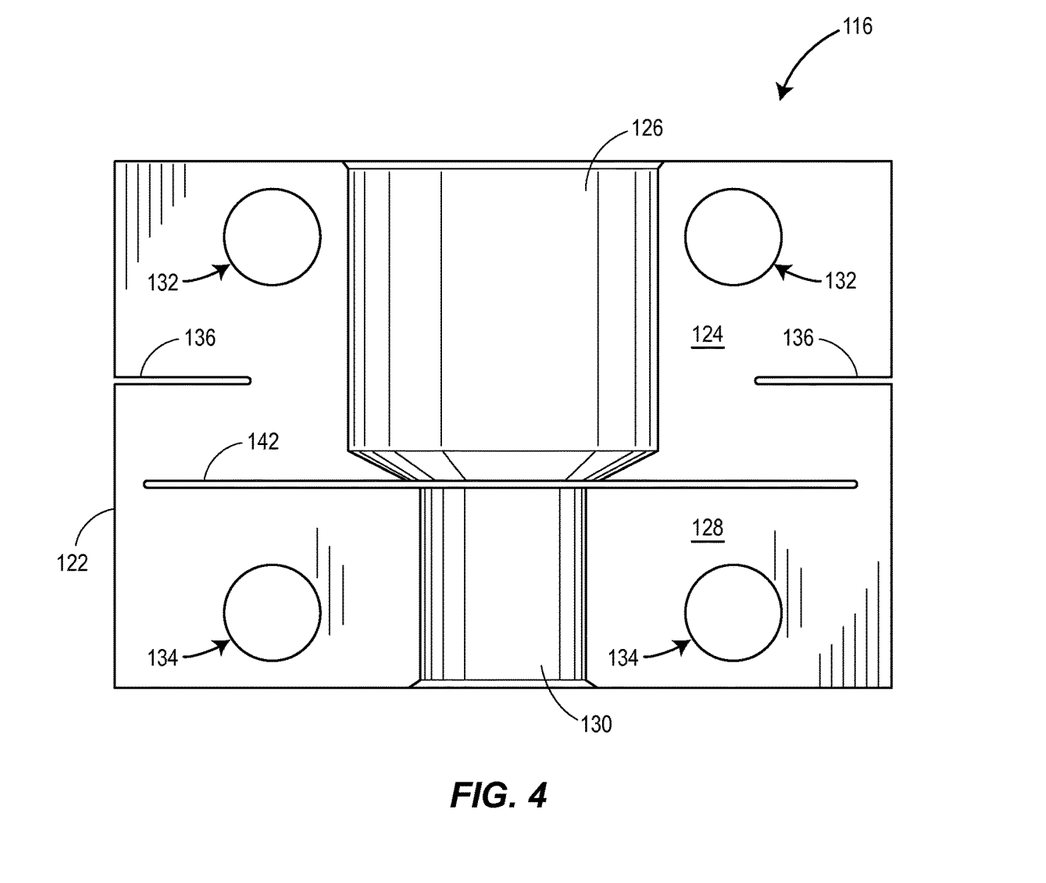
FIG. 4 is a cross-sectional view of the valve stem connector of the present disclosure taken along the lines A-A of FIG. 3.

In addition, a third cut-away section 142 is disposed on each bottom section 128 of the first and second halves 120, 122. As FIG. 4 depicts, the third cut-away section 142 passes through the second half 122 between a bottom section of the first recess 126 adapted to receive the portion of the actuator 110 and a top section of the second recess 130 adapted to receive a portion of the valve stem 114. In other words, the third cut-away section 142 is designed to go through the entire depth of the second half 122, but vertically in between the first recess 126 and the second recess 130.

In one example, the third cut-away section 142 is a slit disposed on the bottom section 128 of each of the first and second halves 120, 122 above the second pair of holes 134. The third cut-away section or slit 142 includes a first end 142a disposed left of center of the first and second halves 120, 122 and a second end 142b disposed right of center of the first and second halves 120, 122. As FIG. 3 depicts, the first cut-away section or slit 138 is disposed immediately above the first end 142a of the third cut-away section, and the second cut-away section or slit 140 is disposed immediately above the second end 142b of the third cut-away section 142. In other words, the first and second cut-away sections 138, 140 are located above and at opposite ends 142a, 142b, respectively, of the third cut-away section 142.

Each of the first, second and third cut-away sections 138, 140 and 142 create a bending beam arrangement. In other words, the construction of the cut-away sections 138, 140, 142 allow for a bending beam 137 between the first cut-away section 138 and the third cut-away section 142 and also between the second cut-away section 140 and the third cut-away section 142, as further explained below.

Still referring to FIG. 3, a pair of pockets or shear web installation sites 144 is also disposed on each of the first and second halves 120, 122. Each pair of pockets or shear web installation sites 144 comprises a first pocket or first site 146 disposed between the first and third cut-away sections 138, 142 of each of the first and second halves 120, 122, and a second pocket or second site 148 disposed between the second and third cut-away sections 140, 142 of each of the first and second halves 120, 122. Each of the first and second pockets or first and second sites 146, 148 creates or has a measurable shear strain and is adapted to receive a force measurement device 150, such as a strain gage or load cell, for measuring the force or strain on the valve stem 114. The shear web design of each of the first and second pockets or the first and second sites 146, 148 creates the high shear strain without producing significant bending deflection, as explained in more detail below.

Figure 5:
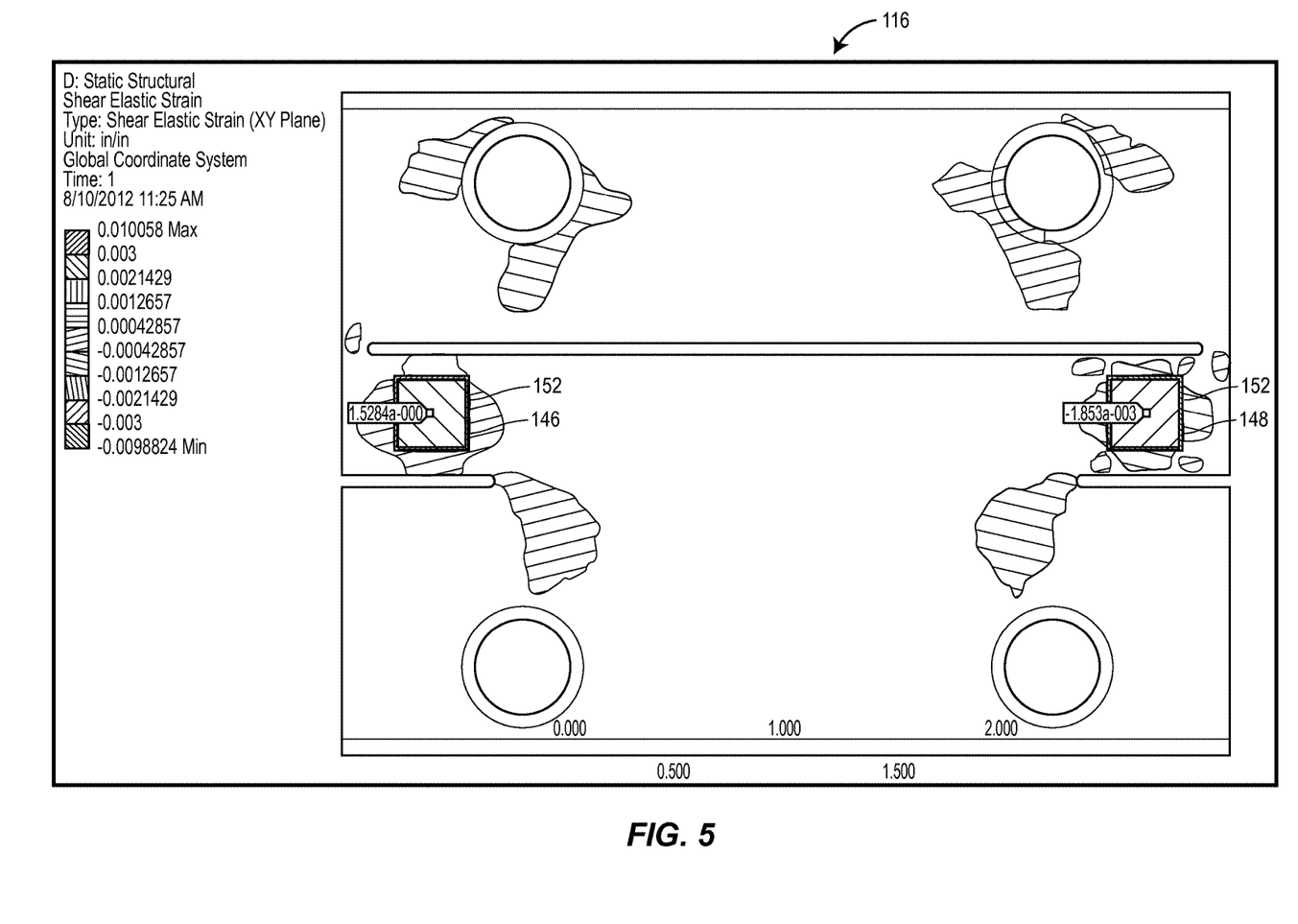
FIG. 5 is a graphical representation of a finite element model analysis of the valve stem connector of the present disclosure.

In one example, each of the first and second pockets 146, 148 or shear web installation sites is a recess or receptacle disposed in a planar surface of the first and second halves 120, 122. As FIGS. 3 and 5 depict, the first and second pockets 146, 148 may have a square cross-section. In other examples, the first and second pockets 146, 148 may include other shapes and cross-sections, such as a rectangle and a circle, and still fall within the scope of the disclosure. In another example, the first and second pockets 146, 148 may each be an envelope-type receptacle disposed in the planar surface of the first and second halves 120, 122. As one of skill in the art will appreciate, the pockets 146, 148 or shear web installation sites may include any structure or design capable of receiving and holding the force measurement device 150 and creating the large shear strain measurable by the force measurement device 150 during operation of the valve assembly 112, for example. Design considerations include the stress increases caused by the geometry changes and the total mechanical strength of the design.

As FIG. 3 also depicts, the force measurement device 150, such as a strain gage or load cell, is disposed or installed within each of the pockets 146, 148 or shear web installation sites at an angle that is approximately 45 degrees to the stem force direction B for maximum sensitivity, for example. Each force measurement device 150 is able to measure force or strain on the valve stem 114 by the actuator 116 in view of the shear web installation site of each of the pockets 146, 148 that create measurable shear strains. Errors in the angle of the strain gage installation will propagate into errors in the measured load. Some of these errors may be corrected by calibration, but other errors will remain. In one example, an error of 1 degree will result in an error of about 2% on an uncalibrated load cell. The calibrated error would be smaller, but not as immune to other loading effects.

Each bending beam 137 and pocket 146, 148 is disposed away from any of the holes 132a, 132b, 134a, 134b, each of the first and second halves 120, 122 of the valve stem connector body 118. As a result, the first and second halves 120, 122 may be secured together via fasteners inserted through the first pair of holes 132 of both the first and second halves 120, 122 without changing any stress or strain on the pockets 146, 148. In a similar manner, fasteners may also be inserted through the second pair of holes 143 of both the first and second halves 120, 122 also without changing any stress on the pockets 146, 148 during operation of the fluid control device 100, for example.

In other words, the shear web type of strain gage installation site of each pocket 146, 148 creates a high, measurable shear strain in each pocket 146, 148 without producing significant bending deflection. This allows the force measurement devices 150, e.g., strain gages, installed within the pockets 146, 148 having such a shear web configuration to accurately measure the strain on the valve stem 114.

Referring now to FIG. 4, an internal, cross-sectional view of the valve stem connector 116 taken along the lines A-A of FIG. 3 is depicted. As illustrated therein, the third cut-away section 142 disposed on the bottom section 128 of each of the first and second halves is disposed between the first recess 126 for receiving a portion of the actuator 110 and the second recess 130 for receiving a portion of the valve stem 114 of the valve assembly 112.

The valve stem connector 116 with at least one integrated force measurement device 150 disposed therein includes provisions for self-temperature compensation and creep compensation. More specifically, because the material and design of the force measurement device or load cell or strain gage will be known, such known factors may be accounted for in the design of the valve stem connector 116. This is a major advantage of the removable valve stem connector 116 having at least one integrated force measurement device 150 disposed therein and not installed directly on the valve stem 114 itself, for example. Said another way, the valve stem connector 116 of the present disclosure can be designed for good load cell or strain gage 150 performance without the material and performance restrictions typically imposed on valve stem designs having a strain gage or load cell mounted thereto.

Referring now to FIG. 5, a graphical representation of a finite element analysis of the valve stem connector 116 of the present disclosure is depicted. The analysis illustrates that high shear strains are evident in pocket 146, for example. Thus, the analysis indicates that the shear web installation site of the pocket 146 can create the necessary strain required for measurement by strain gages or load cells 150 installed therein. In addition, the analysis further illustrates that even strain distributions are present along a length 152 of each pocket 146, 148.

From the foregoing, it should be appreciated that the valve stem connector 116 disclosed herein can be considered a means for connecting the actuator 110 to the valve stem 114 and measuring shear strain of the valve stem 114. Based on the foregoing description, it can be well understood that the structure associated with the valve stem connector 116, including, for example, the body 118 comprising the first and second halves 120, 122, one or more of the first, second and third cut-away sections 138, 140, 142, each pair of pockets 144 or shear web installation sites, and one or more of the force measurement devices 150 can be collectively considered a means for connecting the actuator 10 to the valve stem 114 and measuring shear strain of the valve stem 114 in accordance with the present invention.

While the present invention has been described with reference to specific examples, which are intended to be illustrative only and not to be limiting of the invention, it will be apparent to those of ordinary skill in the art that changes, additions or deletions may be made to the disclosed embodiments without departing from the spirit and scope of the invention. More generally, although certain example apparatus has been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A valve stem connector comprising:
a first half and a second half secured to the first half, each of which includes a top section having a first recess disposed in a center of the first and second halves, the first recess adapted to receive a portion of an actuator, a bottom section having a second recess disposed in the center of the first and second halves, the second recess adapted to receive a portion of a valve stem, a left side edge, and a right side edge;
a pair of cut-away sections disposed in each top section of the first and second halves, each pair of cut-away sections having a first cut-away section disposed on the left side edge left of center of the first and second halves and a second cut-away section disposed on the right side edge right of center of the first and second halves, the first and second cut-away sections being first and second slits, respectively, in the outer left and right side edges, each of the first and second slits spaced from the first recess disposed in the center of the first and second halves;
a third cut-away section disposed in each bottom section of the first and second halves, the third cut-away section disposed between the first recess and the second recess, the third cut-away section being a third slit;
a pair of pockets disposed on each of the first and second halves, each pair of pockets comprising a first site disposed between the first and third slits and a second site disposed between the second and third slits;
a single force measurement device disposed in each pocket of the first and second halves, wherein the single force measurement device is a single strain gage, and each single strain gage is installed in each pocket to measure shear strain of the valve stem; and
a first pair of holes disposed on the top sections of each of the first and second halves and a second pair of holes disposed on the bottom sections of each of the first and second halves, each hole adapted to receive a fastener for securing the first half to the second half
wherein each pocket creates a shear web installation site creating a shear strain measurable by the strain gage.

2. The valve stem connector of claim 1, wherein each of the top and bottom sections of the first and second halves includes a threaded portion, allowing connection between the actuator and the valve stem.

3. The valve stem connector of claim 1, wherein the fastener includes a bolt, a screw, a nail, a pin or other fastener capable of securing the first half to the second half.

4. The valve stem connector of claim 1, wherein each pocket has a length and an even strain distribution across the length.

5. The valve stem connector of claim 1, wherein the third cut-away section is disposed in the bottom section of each of the first and second halves near a center of the first and second halves.

6. The valve stem connector of claim 1, wherein the third cut-away section further includes a first end disposed left of center of the first and second halves and a second end disposed right of center of the first and second halves, and the first cut-away section is disposed above the first end of the third cut-away section, and the second cut-away section is disposed above the second end of the third cut-away section.

7. The valve stem connector of claim 1, wherein the first and second cut-away sections are located at opposite ends of the third cut-away section.

8. A fluid control device comprising:
an actuator;
a valve assembly having a valve stem; and
a valve stem connector removeably disposed between the actuator and the valve stem and connecting the actuator to the valve assembly, the valve stem connector comprising:
a body comprising a first half and a second half secured to the first half, each of which includes a top section having a first recess that receives a portion of the actuator, a bottom section having a second recess that receives a portion of the valve stem, and a side edge,
a plurality of slits disposed in the first and second halves, each slit disposed in the side edge and spaced from the first recess disposed in the center of the first and second halves,
a pair of pockets disposed between the plurality of slits, and
a single strain gage disposed in each pocket of the first and second halves of the body, wherein each single strain gage is installed in each pocket to measure shear strain of the valve stem; and
wherein the plurality of slits allows for a bending beam to minimize deflection and each pocket creates a shear web installation site creating a shear strain measurable by the strain gage, each pocket having a length and an even strain distribution across the length.

9. The device of claim 8, the body further comprising a plurality of holes, each hole adapted to receive a fastener for securing the first half to the second half.

10. The device of claim 9, wherein the plurality of holes includes a first pair of holes disposed on the top sections of each of the first and second halves.

11. The device of claim 10, wherein the plurality of holes further includes a second pair of holes disposed on the bottom sections of each of the first and second halves.

12. The device of claim 11, wherein each bending beam and each pocket is disposed outside each hole, allowing the first and second halves to be secured together without changing stress on the pockets.

13. The device of claim 8, wherein the plurality of slits comprises at least a first slit and a second slit, the first slit spaced from a center of the body and the second slit spaced from the center of the body and adjacent to the first slit.

14. The device of claim 13, wherein the plurality of slits further comprises a third slit disposed on each bottom section of the first and second halves, each third slit disposed below the center of the body.

15. The device of claim 14, wherein each pair of pockets comprises a first pocket disposed between the first and third slits and a second pocket disposed between the second and third slits.

16. The device of claim 8, wherein each top and bottom section of the first and second halves includes a threaded portion, allowing connection between the actuator and the valve stem.

17. The device of claim 8, wherein the fastener includes a bolt, a screw, a nail, a pin or other fastener capable of securing the first half to the second half.

18. The device of claim 8, wherein the third slit further includes a first end disposed left of center of the first and second halves and a second end disposed right of center of the first and second halves, and the first slit is disposed above the first end of the third slit, and the second slit is disposed above the second end of the third slit.

19. The device of claim 8, wherein the first and second slits are located at opposite ends of the third slit.

20. A fluid control device comprising:
an actuator;
a valve assembly having a valve stem; and
means for connecting the actuator to the valve stem and measuring shear strain of the valve stem, the means for connecting the actuator to the valve stem removeably disposed between the actuator and the valve assembly and having a body comprising a first half and a second half secured to the first half, each of which includes a top section having a first recess that receives a portion of the actuator, a bottom section having a second recess that receives a portion of the valve stem, and a side edge, the means for connecting the actuator to the valve stem and measuring shear strain of the valve stem including a pair of pockets disposed between a plurality of slits, each slit disposed in the side edge and spaced from the first recess disposed in the center of the first and second halves, and a single strain gage disposed in each pocket, each single strain gage is installed in each pocket to measure shear strain of the valve stem, and wherein the plurality of slits allows for a bending beam near each pocket and a first pair of holes disposed on the top sections of each of the first and second halves and a second pair of holes disposed on the bottom sections of each of the first and second halves, each hole adapted to receive a fastener for securing the first half to the second half, wherein each bending beam is disposed outside of the first and second pairs of holes, allowing the first and second halves to be secured together without changing stress on the pockets.

* * * * *

UNITED STATES PATENT AND TRADEMARK OFFICE
CERTIFICATE OF CORRECTION

PATENT NO. : 9,874,485 B2  
APPLICATION NO. : 14/037967  
DATED : January 23, 2018  
INVENTOR(S) : Nathan McCormick Page 1 of 1

It is certified that error appears in the above-identified patent and that said Letters Patent is hereby corrected as shown below:

On the Title Page

At item (54), Line 3, "MEASUREMENT" should be -- MEASUREMENT DEVICE --.

In the Specification

At Column 1, Line 3, "MEASUREMENT" should be -- MEASUREMENT DEVICE --.

At Column 5, Line 45, "actuator 116" should be -- actuator 110 --.

At Column 5, Line 62, "holes 143" should be -- holes 134 --.

At Column 6, Line 53, "actuator 10" should be -- actuator 110 --.

In the Claims

At Column 7, Line 40, "half" should be -- half, --.

Signed and Sealed this  
Second Day of October, 2018

Andrei Iancu  
*Director of the United States Patent and Trademark Office*